US012596567B2

(12) United States Patent
Jigalur et al.

(10) Patent No.: US 12,596,567 B2
(45) Date of Patent: Apr. 7, 2026

(54) HIGH AVAILABILITY CONTROL PLANE NODE FOR CONTAINER-BASED CLUSTERS

(71) Applicant: VMWARE, INC., Palo Alto, CA (US)

(72) Inventors: Pradeep Shanmukha Jigalur, Hubli (IN); Christopher John Schaefer, Venice, FL (US)

(73) Assignee: VMware, Inc., Palo Alto, CA (US)

( * ) Notice: Subject to any disclaimer, the term of this patent is extended or adjusted under 35 U.S.C. 154(b) by 515 days.

(21) Appl. No.: 18/119,849

(22) Filed: Mar. 10, 2023

(65) Prior Publication Data

US 2024/0231873 A1 Jul. 11, 2024

(30) Foreign Application Priority Data

Jan. 6, 2023 (IN) .............................. 202341001399

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2004/0107273 A1* | 6/2004 | Dornemann ........ | G06F 11/2097 |
| 2016/0127480 A1* | 5/2016 | Chen ..................... | G06F 9/4856 |
| | | | 718/103 |
| 2018/0239677 A1* | 8/2018 | Radhakrishnan ... | G06F 9/45558 |
| | | | 709/222 |
| 2020/0104222 A1* | 4/2020 | Shemer ............... | G06F 9/45558 |
| | | | 718/104 |
| 2022/0350670 A1* | 11/2022 | Kumble .............. | G06F 9/45558 |

* cited by examiner

*Primary Examiner* — Wynuel S Aquino
(74) *Attorney, Agent, or Firm* — King Intellectual Asset Management

(57) ABSTRACT

The disclosure provides a method for providing a high availability control plane in a container-based cluster. The method generally includes determining a first control plane node is unreachable within a cluster; in response to determining the first control plane node is unreachable, activating a second control plane node previously deployed in the cluster, wherein prior to activing the second control plane node the second control plane node comprises: control plane components, not actively running on the second control plane node, that are configured to manage the other components within the cluster; removing the active control plane node from the cluster; determining a number of inactive control plane nodes associated with the second control plane node is less than a minimum number of inactive control plane nodes; and deploying one or more inactive control plane nodes associated with the second control plane node until the minimum number is reached.

20 Claims, 4 Drawing Sheets

Figure 1A:
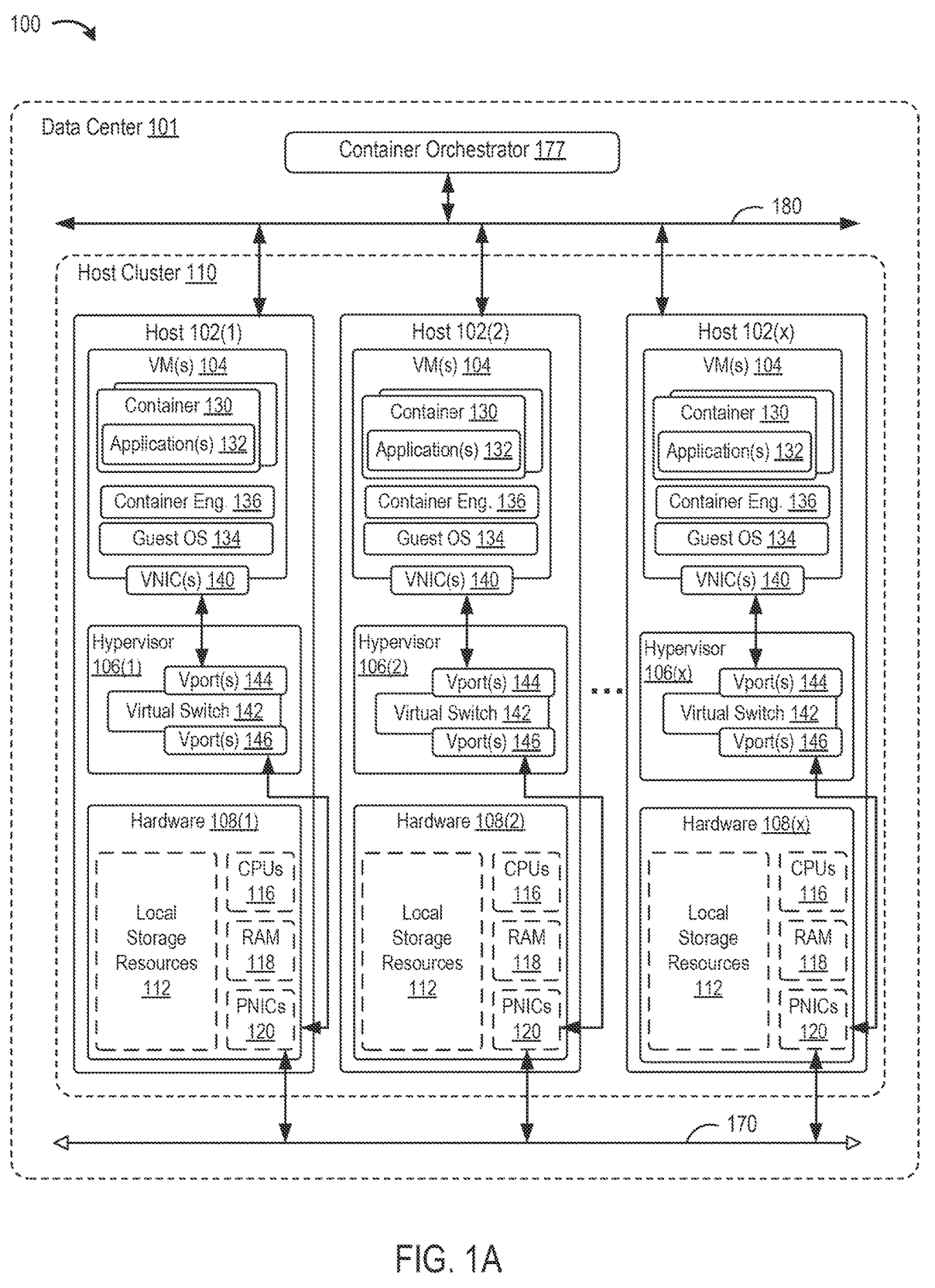

100

Data Center 101

Container Orchestrator 177

— 180

Host Cluster 110

Host 102(1)

VM(s) 104

Container 130

Application(s) 132

Container Eng. 136

Guest OS 134

VNIC(s) 140

Hypervisor 106(1)

Vport(s) 144

Virtual Switch 142

Vport(s) 146

Hardware 108(1)

Local Storage Resources 112

CPUs 116

RAM 118

PNICs 120

Host 102(2)

VM(s) 104

Container 130

Application(s) 132

Container Eng. 136

Guest OS 134

VNIC(s) 140

Hypervisor 106(2)

Vport(s) 144

Virtual Switch 142

Vport(s) 146

Hardware 108(2)

Local Storage Resources 112

CPUs 116

RAM 118

PNICs 120

· · ·

Host 102(x)

VM(s) 104

Container 130

Application(s) 132

Container Eng. 136

Guest OS 134

VNIC(s) 140

Hypervisor 106(x)

Vport(s) 144

Virtual Switch 142

Vport(s) 146

Hardware 108(x)

Local Storage Resources 112

CPUs 116

RAM 118

PNICs 120

HIGH AVAILABILITY CONTROL PLANE NODE FOR CONTAINER-BASED CLUSTERS

RELATED APPLICATION

Benefit is claimed under 35 U.S.C. 119(a)-(d) to Foreign Application Serial No. 202341001399 filed in India entitled "HIGH AVAILABILITY CONTROL PLANE NODE FOR CONTAINER-BASED CLUSTERS", on Jan. 6, 2023 by VMware, Inc., which is herein incorporated in its entirety by reference for all purposes.

Modern applications are applications designed to take advantage of the benefits of modern computing platforms and infrastructure. For example, modern applications can be deployed in a multi-cloud or hybrid cloud fashion. For example, an application may be deployed in a single cloud or across multiple clouds and thus consume both cloud services executing in a public cloud and local services executing in a private data center (e.g., a private cloud). Within the public cloud or private data center, modern applications can be deployed onto one or more virtual machines (VMs), containers, application services, and/or the like.

A container is a package that relies on virtual isolation to deploy and run applications that access a shared operating system (OS) kernel. Containerized applications, also referred to as containerized workloads, can include a collection of one or more related applications packaged into one or more groups of containers, referred to as pods. Containerized workloads run on a container orchestration platform that enables the automation of much of the operational effort required to run containers having workloads and services. This operational effort includes a wide range of things needed to manage a container's lifecycle, including, but not limited to, provisioning, deployment, scaling (up and down), networking, and load balancing.

Kubernetes® (K8S®) software is an example open-source container orchestration platform that automates the deployment and operation of such containerized workloads. In particular, Kubernetes may be used to create a cluster of interconnected nodes, including (1) one or more worker nodes that run the containerized workloads and (2) one or more control plane nodes having control plane components running thereon that control the cluster. Control plane components make global decisions about the cluster (e.g., scheduling), and can detect and respond to cluster events (e.g., starting up a new pod when a workload deployment's intended replication is unsatisfied). As used herein, a node may be a physical machine, or a VM configured to run on a physical machine running a hypervisor.

The worker nodes that run the containerized workloads are interchangeable. Therefore, in a multi-worker node cluster, the failure of one or more worker nodes merely results in the redistribution of workloads on these failed nodes to one or more of the remaining worker nodes without disruption to application users. On the other hand, unlike the worker nodes, control plane nodes are not inherently redundant. For example, a Kubernetes cluster is generally designed as a distributed system with a non-redundant control plane (e.g., control plane component running on a single node). While the failure of a single control plane node won't disrupt containers running on worker nodes in the cluster, the failure will prevent the system from scheduling new workloads and/or restarting already running workloads, should these workloads or the nodes they are running on fail. As such, ensuring fault tolerance for the control plane is critical in production environments given the control plane offers the cluster (1) high availability (e.g., high availability is a characteristic of a component or system that is capable of operating continuously without failing), (2) allows the cluster to recover from worker node failure, (3) responds to increased demands for pods, etc.

To build a fault tolerant container-based cluster (e.g., a cluster that can withstand the failure of control plane components without disruption of service to the cluster), one approach is to deploy control plane components on multiple nodes (e.g., resulting in two or more control plane nodes) in the cluster. By having control plane components deployed on more than one node, when one of the nodes fail, effects of the failure may be minimized. In particular, the redundant control plane components running on other control plane node(s) in the cluster may continue to manage workloads within the cluster. Further, traffic originally directed to the failed control plane node may be redirected to the other control plane nodes to allow for continuous operation. The failed control plane node may then be removed from the cluster. While this approach provides fault tolerance for control plane components, this approach may result in re-directing traffic of a failed control plane node to other control plane nodes in the cluster, thereby resulting in an increased load on the remaining other control plane nodes still active within the cluster.

In some cases, the container-based cluster may include a cluster autoscaler configured to adjust a number of nodes in the cluster. For example, the autoscaler may be configured to add additional nodes to the cluster when existing nodes in the cluster are at capacity (e.g., insufficient resources to run additional workloads) and/or when a previously existing node in the cluster fails. However, initiating the addition of a node by the autoscaler may be manual. For example, when a control plane node fails and a new control plane node is to be instantiated in the cluster, a user may call an application programming interface (API) to trigger the addition by the autoscaler. In response, the autoscaler may deploy the control plane node in the cluster, where it will be configured and bootstrapped. Manually calling the autoscaler, deploying the new control plane node, and configuring the new control plane node may take time. Thus, in cases where only two control plane nodes previously existed in the cluster, where one of these control plane nodes fail, for at least the period of time it takes to perform these steps, the cluster may no longer offer high availability of control plane components in the cluster due to there not being another control plane node should the one remaining control plane node fail. Further, during this time, the remaining control plane node may be expected to handle the additional load of the failed control plane node.

It should be noted that the information included in the Background section herein is simply meant to provide a reference for the discussion of certain embodiments in the Detailed Description. None of the information included in this Background should be considered as an admission of prior art.

SUMMARY

One or more embodiments provide a method for providing a high availability control plane in a container-based cluster. The method generally includes determining a first control plane node is unreachable within the container-based cluster. The first control plane node comprises first control plane components that are actively running on the first control plane node and that are configured to manage other components within the container-based cluster. Further, the first control plane comprises a first network interface activated to allow for management of the other components within the container-based cluster by the first control plane components. In response to determining the first control plane node is unreachable, the method includes activating a second control plane node previously deployed in the container-based cluster. Prior to activating the second control plane node, the second control plane node comprises second control plane components that are not actively running on the second control plane node, and that are configured to manage the other components within the container-based cluster. Further, prior to activating the second control plane node, the second control plane node comprises a second network interface deactivated and configured to allow for management of the other components within the container-based cluster by the second control plane components. In response to determining the first control plane node is unreachable, the method further includes removing the active control plane node from the container-based cluster. Additionally, the method includes determining that a number of inactive control plane nodes associated with the second control plane node and comprising control plane components not actively running on the inactive control plane nodes is less than a minimum number of inactive control plane nodes that are to be deployed in the container-based cluster for the second control plane node. Based on this determination, the method further includes deploying one or more inactive control plane nodes associated with the second control plane node in the container-based cluster until the minimum number of the inactive control plane nodes that are to be deployed in the container-based cluster for the second control plane node is met.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

FIG. 1A depicts example physical and virtual network components in a networking environment in which embodiments of the present disclosure may be implemented

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1B:
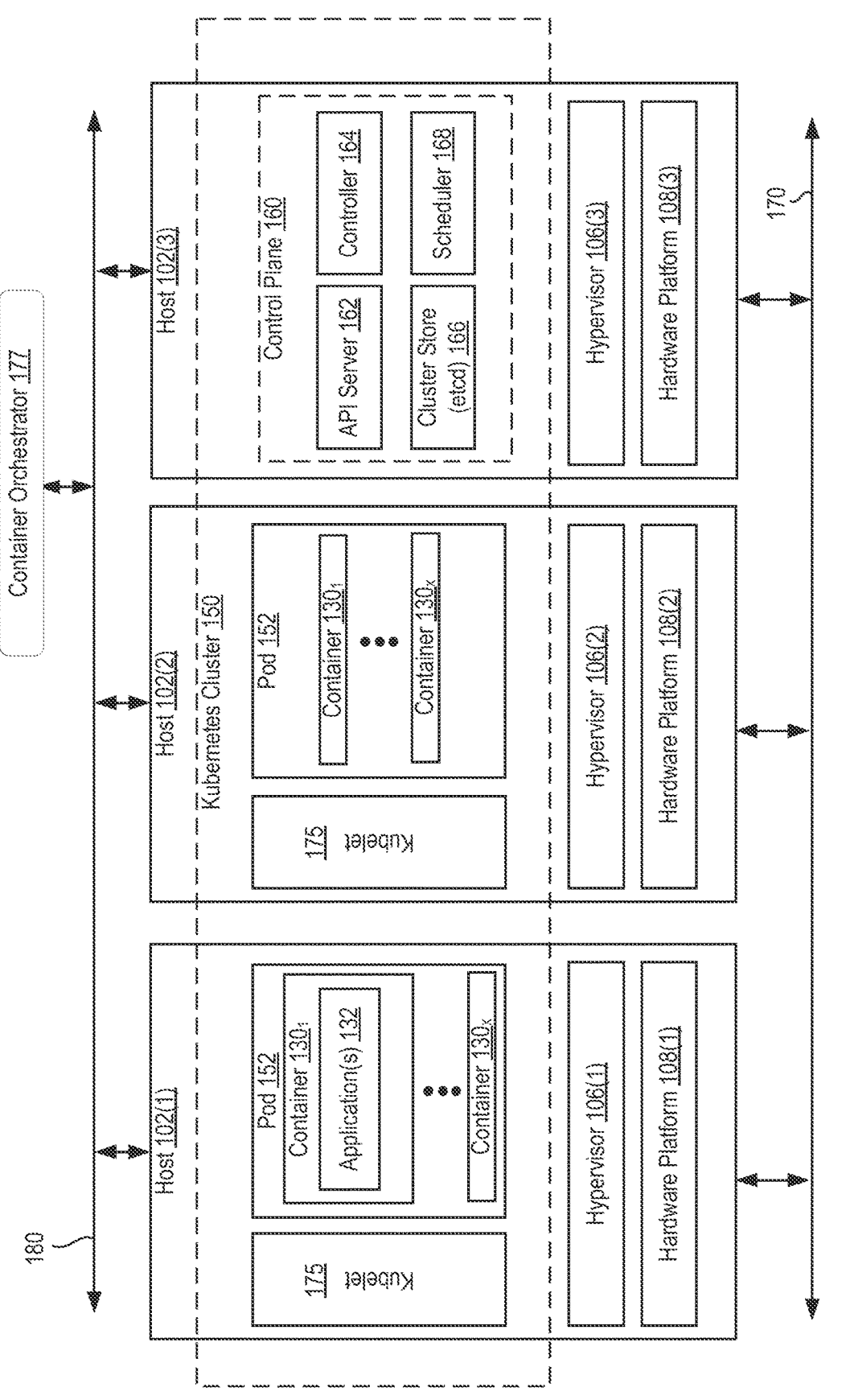
FIG. 1B illustrates an example cluster for running containerized workloads in the network environment of FIG. 1A, according to an example embodiment of the present disclosure.

Improved techniques for providing a high availability control plane node in container-based clusters are described herein. The container-based cluster may be a Kubernetes cluster; however, the techniques described herein may similarly be applied to other container-based clusters deployed based on different container orchestration platform offerings.

To provide a high availability control plane, embodiments herein introduce a new node, referred to as a "witness node," in the container-based cluster. The witness node is deployed to help maintain a quorum of inactive control plane nodes for every active control plane node within the cluster. The quorum may be set by an administrator of the cluster to ensure that every active control plane node has at least one inactive control plane node deployed in the cluster. For example, where the quorum is set to one and one active control plane node exists in the cluster, one inactive control plane node, at a minimum, is expected to be deployed within the cluster.

As used herein, an active control plane node is a node deployed and instantiated in the cluster that has control plane components actively running thereon. The active control plane node may perform load balancing with other active control plane nodes in the cluster to manage pods and workloads running within the cluster. On the other hand, an inactive control plane node, which may also be referred to as a failover control plane node) is a node deployed such that it is ready to take over operations of an active control plane node should the active control plane node or its connectivity to the network fail. Control plane components of the inactive control plane node may not be actively running thereon to manage pods and workloads running within the cluster. By having inactive control plane nodes deployed in the cluster, when an active control plane node fails, the inactive control plane node may be automatically brought up to replace the previously-active control plane node such that other active control plane nodes in the cluster are not burdened by the load of the previously-active control plane node. Further, inactive control plane nodes help to ensure high availability of control plane components in cases where the active control plane node is the only active control plane node in the cluster (e.g., where the load is not able to be distributed to other active nodes because they do not exist).

To maintain a quorum of inactive control plane nodes in the cluster, the witness node is configured to automatically deploy inactive control plane nodes such that the quorum of inactive control plane nodes is satisfied for each active control plane node. As used herein, deploying an inactive control plane node involves making a new node available in the cluster. Deploying further involves activating a first network interface (e.g., a first Ethernet interface or eth1) of the node that allows the node to communicate with other nodes in the cluster over a high availability network. The node may further include a second network interface (e.g., second Ethernet interface or eth0) that allows the node to communicate with (and manage) other nodes and/or components over a management network; however, this Ethernet interface may not be activated when deploying the node. As such, the node may remain in an "inactive state." The high availability network and the management network may be implemented as separate physical networks, as separate virtual local area networks (VLANs) on the same physical network, or as separate overlay networks.

The witness node is configured to automatically deploy inactive control plane node(s) (1) when the cluster is initially created and a quorum is set, (2) when the quorum is increased by an administrator of the cluster, and/or (3) when new active control plane nodes are added to the cluster. Further, the witness node is configured to automatically deploy inactive control plane node(s) (4) when a previously-inactive control plane node is brought up to replace a previously-active control plane node that has failed in the cluster. As such, the witness node may further be configured to monitor for the existence of active control plane nodes in the cluster.

In certain aspects, a heartbeat service is implemented at the witness node to send and receive heartbeats (e.g., packets of data) to each of the active control plane nodes in the cluster. The witness node may take action to bring up an inactive control plane node (e.g., already deployed in the cluster) when an active control plane node fails to transmit at least a threshold amount of heartbeat responses (e.g., after failing to send one response, two responses, etc.) to the witness node. In other words, the witness node may act to move the inactive control plane node from the "inactive state" to an "active state" (e.g., where control plane components and eth0 on the node are activated). Transitioning a state of the inactive control plane node to the "active state" may result in a decreased number of inactive control plane nodes in the cluster that, in some cases, is less than the quorum. As such, the witness node may be configured to deploy a new inactive control plane node in the cluster.

As such, techniques described herein provide a robust solution for achieving a high availability control plane in a container-based cluster. The techniques provide a high availability control plane by continuously monitoring active control plane nodes in the cluster and automatically bringing up inactive control plane nodes upon the detection of an active control plane node failure. Existing active control plane nodes in the cluster may not be required to take on the load of the failed control plane node. Further, by having resources prepared for control plane components at inactive control plane nodes deployed in the cluster, when an active control plane node fails, the time needed for recovery of control plane components on the inactive control plane node may be minimized.

FIG. 1A depicts example physical and virtual network components in a networking environment 100 in which embodiments of the present disclosure may be implemented. Networking environment 100 includes a data center 101. Data center 101 includes one or more hosts 102, a management network 180, a high availability network 170, and a container orchestrator 177.

Host(s) 102 may be communicatively connected to management network 180 and high availability network 170. High availability network 170 and management network 180 enables communication between hosts 102, and/or between other components and hosts 102.

High availability network 170 and management network 180 may be separate physical networks or may be logically isolated using a single physical network and separate VLANs or logical overlay networks, or a combination thereof. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be in a single host cluster or logically divided into a plurality of host clusters. Each host 102 may be configured to provide a virtualization layer, also referred to as a hypervisor 106, that abstracts processor, memory, storage, and networking resources of a hardware platform 108 of each host 102 into multiple VMs $104_1$ to $104_N$ (collectively referred to as VMs 104 and individually referred to as VM 104) that run concurrently on the same host 102.

Host(s) 102 may be constructed on a server grade hardware platform 108, such as an x86 architecture platform. Hardware platform 108 of each host 102 includes components of a computing device such as one or more processors (central processing units (CPUs)) 116, memory (random access memory (RAM)) 118, one or more network interfaces (e.g., physical network interfaces (PNICs) 120), storage 112, and other components (not shown). CPU 116 is configured to execute instructions that may be stored in memory 118, and optionally in storage 112.

The network interface(s) enable hosts 102 to communicate with other devices via a physical network, such as management network 180 and high availability network 170. In certain aspects, the network interfaces on each host 102 include a first network interface (e.g., eth0 illustrated in FIGS. 2A and 2B, which may be a PNIC 120) and a second network interface (e.g., eth1 illustrated in FIGS. 2A and 2B, which may be a PNIC 120). Eth0 on a host 102 may allow the host 102 to communicate with other hosts 102 and/or components over management network 180. Eth1 on a host 102 may allow the host 102 to communicate with other hosts 102 and/or components over high availability network 170.

In certain aspects, hypervisor 106 may run in conjunction with an operating system (not shown) in host 102. In some embodiments, hypervisor 106 can be installed as system level software directly on hardware platform 108 of host 102 (often referred to as "bare metal" installation) and be conceptually interposed between the physical hardware and the guest operating systems executing in the VMs 104. It is noted that the term "operating system," as used herein, may refer to a hypervisor.

Each of VMs 104 running on each host 102 may include virtual interfaces, often referred to as virtual network interfaces (VNICs), such as VNICs 140, which are responsible for exchanging packets between VMs 104 and hypervisor 106, such as with a virtual switch 142 running in the hypervisor 106. The virtual switch on each host operates as a managed edge switch implemented in software by a hypervisor on each host. Virtual switches provide packet forwarding and networking capabilities to VMs running on the host. VNICS 140 can connect to Vports 144, provided by virtual switch 142. In this context "connect to" refers to the capability of conveying network traffic, such as individual network packets, or packet descriptors, pointers, identifiers, etc., between components so as to effectuate a virtual datapath between software components. Virtual switch 142 also has Vport(s) 146 connected to PNIC(s) 120, such as to allow VMs 104 (and containers 130 running in VMs 104, as described below) to communicate with virtual or physical computing devices outside of host 102 via high availability network 170 and/or management network 180.

Further, each of VMs 104 implements a virtual hardware platform that supports the installation of a guest OS 134 which is capable of executing one or more applications. Guest OS 134 may be a standard, commodity operating system. Examples of a guest OS include Microsoft Windows, Linux, and/or the like.

In certain embodiments, each VM 104 includes a container engine 136 installed therein and running as a guest application under control of guest OS 134. Container engine 136 is a process that enables the deployment and management of virtual instances (referred to herein as "containers") in conjunction with OS-level virtualization on guest OS 134 within VM 104 and the container orchestration platform. Containers $130_1$ to $130^Y$ (collectively referred to as containers 130 and individually referred to as container 130) provide isolation for user-space processes executing within them. Containers 130 encapsulate an application, such as application 132 as a single executable package of software that bundles application code together with all of the related configuration files, libraries, and dependencies required for it to run. Application 132 may be any software program, such as a word processing program or a database server.

In certain embodiments, data center 101 can include a container orchestrator 177. Container orchestrator 177 implements an orchestration control plane, such as a Kubernetes control plane, to deploy and manage applications and/or services thereof on hosts 102, of a host cluster 110, using containers 130. For example, Kubernetes may deploy containerized applications as containers 130 and a control plane on a cluster of hosts 102. The control plane, for each cluster of hosts, manages the computation, storage, and memory resources to run containers 130. Further, the control plane may support the deployment and management of applications (or services) on the cluster using containers 130. In some cases, the control plane deploys applications as pods of containers running on hosts 102, either within VMs 104 or directly on an OS of the host. An example container-based cluster for running containerized workloads is illustrated in FIG. 1B. While the example container-based cluster shown in FIG. 1B is a Kubernetes cluster 150, in other examples, the container-based cluster may be another type of container-based cluster based on container technology, such as Docker Swarm clusters.

As illustrated in FIG. 1B, Kubernetes cluster 150 is formed from a combination of one or more pods 152 including one or more containers 130, one or more kubelets 175, and a control plane 160 running on one or more nodes. As described above, a node may be a physical machine, such as a host 102, or a VM 104 (not shown in FIG. 1B) configured to run on a host 102 running a hypervisor 106. The nodes may be a combination of worker nodes (e.g., running pods, 152, containers, 130, and kubelets 175) and control plane nodes (e.g., running components of control plane 160). For the example Kubernetes cluster 150, the nodes may be hosts 102, and more specifically, hosts 102(1) and 102(2) may be worker nodes while host 102(3) may be a control plane node.

Further, although not illustrated in FIG. 1B, Kubernetes cluster 150 may include one or more kube proxies. A kube proxy is a network proxy that runs on each host 102 in Kubernetes cluster 150 that is used to maintain network rules. These network rules allow for network communication with pods 152 from network sessions inside and/or outside of Kubernetes cluster 150.

Kubelet 175 is an agent that helps to ensure that one or more pods 152 run on each node according to a defined state for the pods 152, such as defined in a configuration file. Each pod 152 may include one or more containers 130.

Control plane 160 includes components such as an API server 162, a cluster store (etcd) 166, a controller 164, and a scheduler 168. Control plane 160's components make global decisions about Kubernetes cluster 150 (e.g., scheduling), as well as detect and respond to cluster events.

API server 162 operates as a gateway to Kubernetes cluster 150. As such, a command line interface, web user interface, users, and/or services communicate with Kubernetes cluster 150 through API server 162. One example of a Kubernetes API server 162 is kube-apiserver. Instances of kube-apiserver are designed to scale horizontally-that is, this component scales by deploying more instances. Several instances of kube-apiserver may be run, and traffic may be balanced between those instances.

Cluster store (etcd) 166 is a data store, such as a consistent and highly-available key value store, used as a backing store for Kubernetes cluster 150 data. In certain aspects, cluster store (etcd) 166 stores a configuration file made up of one or more manifests that declare intended system infrastructure and workloads (for application(s) 132) to be deployed in Kubernetes cluster 150.

Controller 164 is a control plane 160 component that runs and manages controller processes in Kubernetes cluster 150. For example, control plane 160 may have (e.g., four) control loops called controller processes, that watch the state of Kubernetes cluster 150 and try to modify the current state of Kubernetes cluster 150 to match an intended state of Kubernetes cluster 150. In certain aspects, controller processes of controller 164 are configured to monitor for changes to the state of Kubernetes cluster 150.

Scheduler 168 is a control plane 160 component configured to allocate new pods 152 to hosts 102. Additionally, scheduler 168 may be configured to distribute workloads, across containers 130, pods 152, and/or nodes (e.g., in some cases, hosts 102) that are assigned to use resources of hardware platform 108. Resources may refer to processor resources, memory resources, networking resources, and/or the like. In some cases, scheduler 168 may schedule newly created containers 130 to one or more of the nodes in Kubernetes cluster 150.

In other words, control plane 160 manages and controls every component of Kubernetes cluster 150. Control plane 160 handles most, if not all, operations within Kubernetes cluster 150, and its components define and control Kubernetes cluster 150's configuration and state data. Control plane 160 configures and runs the deployment, management, and maintenance of the containerized applications 132. As such, ensuring high availability of the control plane 160 is important for container deployment and management.

Thus, according to aspects described herein, control plane 160 may operate as a high availability control plane. To implement control plane 160 as a high availability control plane 160 in a container-based cluster, both active control plane node(s) and inactive control plane node(s) may be implemented in the cluster. As described above, an active control plane node may have control plane components (e.g., API server 162, controller 164, cluster store (etcd) 166, and scheduler 168) actively running on the active control plane node to manage and control components in the cluster. Further, an inactive control plane node may be deployed in the cluster with prepared resources for running control plane components at the node should an active control plane node, associated with the inactive control plane node, fail. An inactive control plane node may be associated with an active control plane node where the cluster store (etcd) 166 of the inactive control plane node is synced with the cluster store (etcd) 166 of the active control plane node. A quorum specifying a number of inactive control plane nodes that are to be deployed in the cluster for a single active control plane node may dictate the number of inactive control plane nodes that are to be deployed in the cluster at a single time.

In certain aspects, the quorum of inactive control plane nodes in the cluster is managed by a witness node deployed in the cluster. For example, the witness node may have one or more services running thereon that monitor inactive control plane nodes in the cluster and try to modify a number of inactive control plane nodes in the cluster when the number of inactive control plane nodes is below the quorum intended for the cluster. As such, by ensuring that the quorum is always met and/or taking actions to meet quorum where a number of inactive control plane nodes in the cluster is less than the specified quorum, a high availability control plane 160 may be provided by the container-based cluster.

Further, additional services running on the witness node may monitor active control plane node health (e.g., of active control plane nodes in the cluster) and bring up inactive control plane node(s) in the cluster when one or more active control plane nodes are determined to be unresponsive and/or have failed. Such example services provided by the witness node to provide a high availability control plane 160 in a container-based cluster are described in more detail with respect to FIGS. 2A and 2B.

Figure 2A:
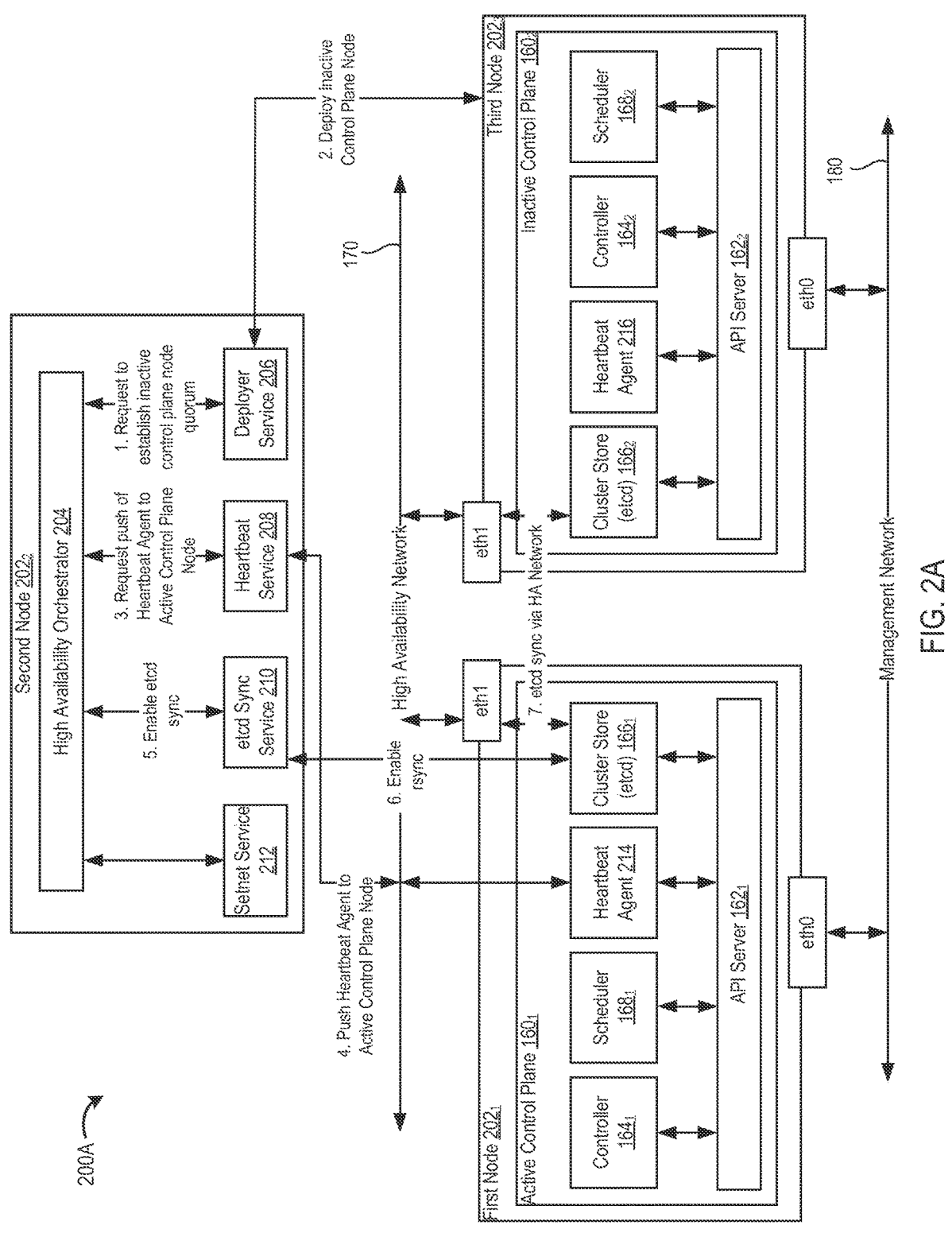
FIG. 2A illustrates example operations for deploying an inactive control plane node, according to an example embodiment of the present disclosure.

For example, FIG. 2A illustrates example operations 200A for deploying an inactive control plane node. For the example illustrated in FIG. 2A, a container-based cluster (e.g., such as Kubernetes cluster 150 illustrated in FIG. 1B) may be formed from a combination of one or more applications and corresponding workloads, one or more kubelets, and a control plane 160. Control plane 160 (e.g., having control plane components including controller 164, scheduler 168, cluster store (etcd) 166, and API server 162) may be running on a first node $202_1$ that is a host or a VM running on a host in the cluster. First node $202_1$ may be considered an active control plane node given the control plane components on first node $202_1$ are actively running on first node $202_1$ to control and manage components in the cluster.

To provide high availability for control plane 160 on first node $202^1$, a high availability orchestrator 204 is deployed on a second node $202_2$, which may be a witness node. Second node $202_2$ may be a different host or another VM running on a same or different host than first node $202_1$. High availability orchestrator 204 is configured to control the overall functioning of services running on second node $202_2$. High availability orchestrator 204 may control these services such that these services perform operations for (1) identifying failure of one or more active control plane nodes in the cluster, (2) recovering failed control plane components on another node in the cluster, such as on a previously deployed inactive control plane node, and (3) restoring the intended quorum of inactive control plane nodes in the cluster subsequent to the recovery.

Services running on second node $202_2$ include a deployer service 206, a heartbeat service 208, an eted sync service 210, and a setnet service 212. Deployer service 206 is configured to deploy inactive control plane nodes in the cluster. In certain aspects, deployer service 206 deploys inactive control plane node(s) in response to receiving request(s) to deploy these nodes from high availability orchestrator 204. High availability orchestrator 204 may transmit a request to deployer service 206 to deploy an inactive control plane node in the cluster when a number of inactive control plane nodes in the cluster is less than a number of inactive control plane nodes in a specified quorum for the cluster.

The heartbeat service 208 is configured to deploy a heartbeat agent on cach active control plane node in the cluster. Deployment of the heartbeat agent on each active control plane node allows heartbeat service 208 to monitor the status of each active control plane node and determine whether each active control plane node in the cluster is available and responsive. With this information, heartbeat service 208 may identify when an active control plane node in the cluster fails and report this information to high availability orchestrator 204. In certain aspects, heartbeat service 208 deploys heartbeat agents on active control plane nodes in response to receiving requests to deploy heartbeat agents from high availability orchestrator 204. High availability orchestrator 204 may transmit such requests to heartbeat service 208 when, for example, (1) a new active control plane node is added to the cluster and/or (2) when a previously-inactive control plane node is activated to be an active control plane node in the cluster.

Etcd sync service 210 is responsible for managing the etcd sync between an active control plane node and an inactive control plane node. An eted sync occurs between an active control plane node and an inactive control plane node in the cluster such that an intended state of the cluster (e.g., intended system infrastructure and workloads for the cluster) indicated by manifests stored in the cluster store etcd 166 at the active control plane node matches an intended state of the cluster indicated by manifests stored in the cluster store etcd 166 at the inactive control plane node. Thus, when the inactive control plane node is brought up as a result of a detected failure of the active control plane node, control components on the previously-inactive (e.g., now active) control plane node are aware of the intended state of the cluster. Thus, the control plane components may work to maintain the intended state of the cluster. In certain aspects, eted sync service 210 initiates an eted sync between an active control plane node and an inactive control plane node in the cluster in response to receiving a request to initiate the sync from high availability orchestrator 204.

Setnet service 212 is configured to initiate the bringing up of an inactive control plane node. To initiate bringing up of the inactive control plane node, setnet service 212 is configured to enable eth0 at the inactive control plane node such that the inactive control plane node is able to communicate with other nodes and/or components over the management network 180. An internet protocol (IP) address of the failed active control plane node may be assigned to the previously-inactive (e.g., now active) control plane node when eth0 is enabled at the inactive control plane node. Assigning the IP address of the failed active control plane node to the previously-inactive (e.g. now active) control plane node allows traffic originally directed to the failed active control plane node, to now be directed to the previously-inactive, now active, control plane node. In certain aspects, setnet service 212 is further configured to transmit a gratuitous address resolution protocol (GARP). The GARP is an address resolution protocol (ARP) broadcast that is used to inform the network about the updated IP address assignment to the previously-inactive, now active, control plane node. In certain aspects, the GARP may inform the network that the IP address is now associated with the MAC address of the previously-inactive, now active, control plane node instead of the MAC address of the failed active control plane node.

For the illustrated example in FIG. 2A, high availability orchestrator 204 and deployer service 206 may be used to deploy inactive control plane $160_2$ on third node $202_3$, thereby creating an inactive control plane node for (e.g., associated with) the active control plane node (e.g., active control plane $160_1$ on first node $202_1$). Further, high availability orchestrator 204, heartbeat service 208, and eted sync service 210 may be used to deploy a hearbeat agent 214 on active control plane $160_1$ and sync cluster store (etcd) $166_1$ on active control plane $160_1$ with cluster store (etcd) $166_2$ on inactive control plane $160_2$.

As illustrated in FIGS. 2A, at a first operation, high availability orchestrator 204 may communicate with deployer service 206 to request that deployer service 206 establishes the inactive control plane node quorum for the cluster. Though not meant to be limiting to this example, the inactive control plane node quorum intended for the cluster (e.g., by an administrator of the cluster) is equal to one. In other words, for every active control plane node deployed in the cluster, one inactive control plane node, at a minimum, is to be deployed in the cluster. Because in this example, only one active control plane node exists (e.g., active control plane $160_1$ on first node $202_1$), deployer service 206 may need to deploy a single inactive control plane node.

At a second operation, in response to receiving the request from high availability orchestrator 204, deployer service 206 deploys third node $202_3$ in the cluster and further deploys inactive control plane $160_2$ on third node $202_3$. In certain other aspects, deploy service 206 deploys third node $202_3$ having inactive control plane $160_2$ in the cluster by obtaining images/open virtualization formats (OVFs) used for instantiating the active control plane $160_1$ on first node $202_1$ and storing these images/OVFs at the third node $202_3$. These images/OVFs may be obtained from a repository. Further, the inactive control plane node may be deployed with a same t-shirt size as the active control plane node (e.g., sizes offered by cloud infrastructure as a service (IaaS) providers are provided as t-shirt sizes). The deployed inactive control plane node (e.g., third node $202_3$) may have a first network interface (e.g., eth1) activated that allows the node to communicate with other nodes and/or components over high availability network 170. However, a second network interface (e.g., eth0) of the deployed inactive control plane node (e.g., third node $202_3$) may not be activated; thus, the inactive control plane node may not be able to communicate with other nodes and/or components over management network 180.

After deploying inactive control plane $160_2$ on third node $202_3$, at a third operation, high availability orchestrator 204 requests heartbeat service 208 to deploy a heartbeat agent on active control plane $160_1$ on first node $202_1$, such that heartbeat service 208 can monitor the status/availability of active control plane $160_1$ on first node $202_1$. In response to receiving the request at the third operation, at a fourth operation, heartbeat service 208 deploys heartbeat agent 214 on active control plane $160_1$ on first node $202_1$. In certain aspects, heartbeat service 208 deploys heartbeat agent 214 by communicating with first node $202_1$ over high availability network 170 (and via eth1 on first node $202_1$).

After deploying heartbeat agent 214 on active control plane $160_1$, at a fifth operation, high availability orchestrator 204 requests eted sync service 210 to enable an etcd sync between cluster store (etcd) $166_1$ on active control plane $160_1$ and cluster store (etcd) $166_2$ on inactive control plane $160_2$. In response to receiving the request at the fifth operation, at a sixth operation, etcd sync service 210 enables the etcd sync via invoking rsync. Rsync is a command-line tool for copying files and directories between local and remote systems. Invoking rsync triggers the etcd sync between cluster store (etcd) $166_1$ and cluster store (etcd) $166_2$ at a seventh operation. The etcd sync may occur over high availability network 170. Thus after the seventh operation, inactive control plane $160_2$ on third node $202_3$ may be prepared to continue operations of control plane components on first node $202_1$ should first node $202_1$ fail and/or become unresponsive.

Figure 2B:
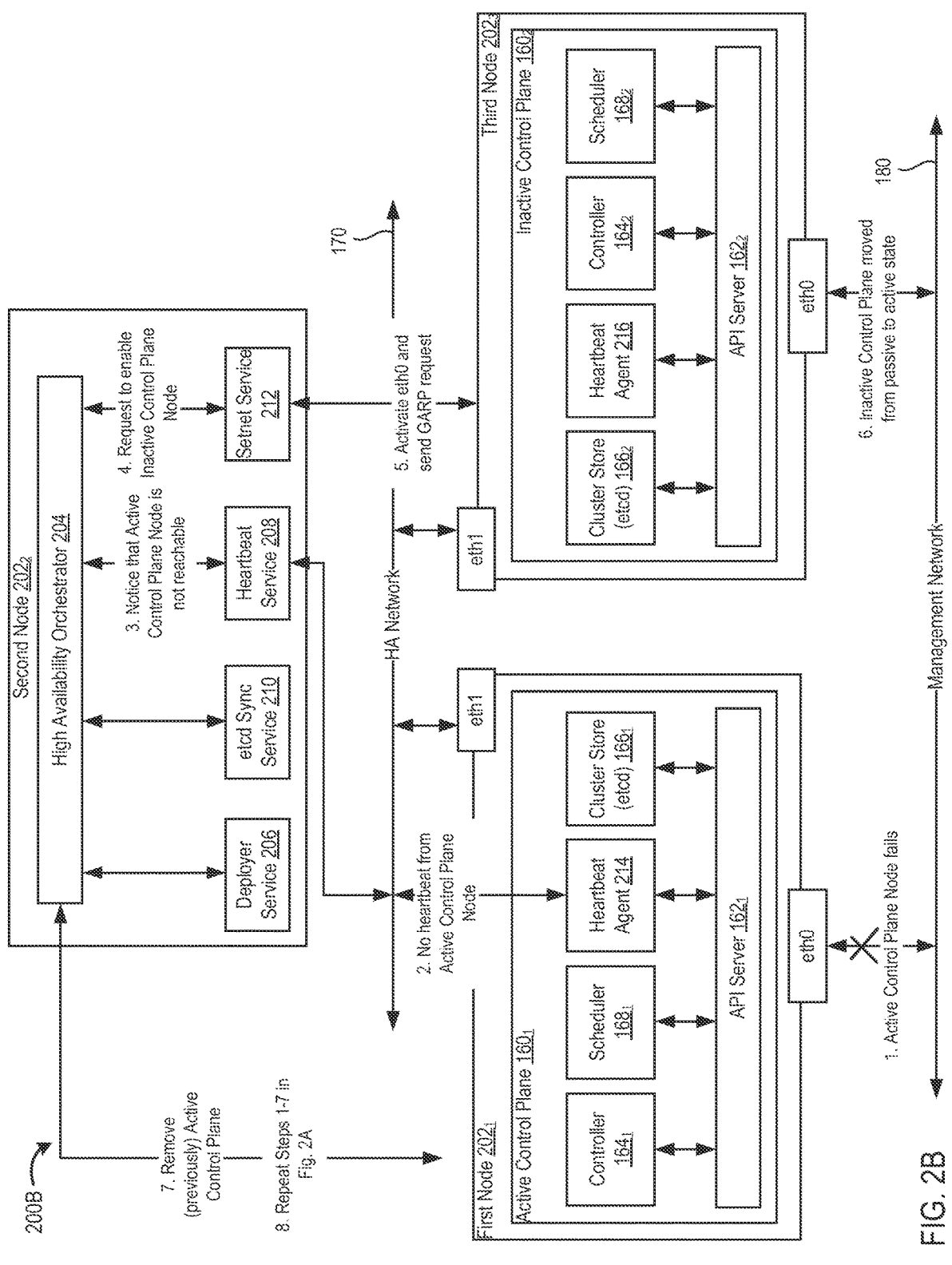
FIG. 2B illustrates example operations for activating the inactive control plane node when the active control plane node is no longer reachable, according to an example embodiment of the present disclosure.

FIG. 2B illustrates example operations 200B for activating inactive control plane $160_2$ on third node $202_3$ when active control plane $160_1$ on first node $202_1$ is no longer reachable. As illustrated in FIG. 2B, at a first operation, active control plane $160_1$ on first node $202_1$ fails. Thus, when heartbeat service 208 requests a heartbeat response (e.g., a packet response) from heartbeat agent 214 on first node $202_1$ (via high availability network 170), heartbeat service 208 may not receive the requested response. In certain aspects, heartbeat service 208 requests more than one heartbeat response from heartbeat agent 214, and where a number of requested responses are not received (e.g., above a threshold) by heartbeat service 208, heartbeat service 208 may inform high availability orchestrator 204 of first node $202_1$'s unresponsiveness. For example, at a third operation, heartbeat service 208 provides a notice, to high availability orchestrator 204, that first node $202_1$ is not reachable.

Based on receiving the notice, high availability orchestrator 204 may determine that active control plane $160_1$ on first node $202_1$ is no longer active. As such, control plane components on inactive control plane $160_2$ on third node $202_3$ may need to be activated such that operations previously being performed by control pane components on active control plane $160_1$ can continue to be carried out. As such, at a fourth operation, high availability orchestrator 204 requests that setnet service 212 enable/activate inactive control plane $160_2$ on third node $202_3$. In response to receiving the request, at a fifth operation, setnet service 212 activates eth0 at third node $202_3$ such that third node $202_3$ is able to communicate with other nodes and/or components over the management network 180. Further, setnet service 212 transmits a GARP to update the network about the assignment of the IP address of active control plane $160_1$ to the MAC addresses of now active third node $202_3$ instead. Activating eth0 at third node $202_3$ causes inactive control plane $160_2$ on third node $202_3$ to move from an inactive state to an active state at a sixth operation. Accordingly, at a seventh operation, high availability orchestrator 204 causes the removal of the previously-active active control plane node (e.g., previously-active first node $202_1$ having active control plane $160_1$).

At this point, only third node $202_3$, having now-active (previously-inactive) control plane $160_2$, exists in the cluster. Thus, the quorum requiring that each active control plane node has at least one inactive control plane node may be unsatisfied in the cluster. Accordingly, to add a new inactive control plane node to meet the intended quorum for the cluster, operations 1-7 illustrated in FIG. 2A may be repeated. Operations 2A and 2B may be continuously performed to deploy new inactive control plane nodes in the cluster and bring up previously-deployed inactive control plane nodes as active control plane nodes when, for example, an active control plane node in the cluster is unresponsive and/or fails and/or when a quorum specified for the cluster is altered.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, cach having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for providing a high availability control plane in a container-based cluster, the method comprising:

determining a first control plane node is unreachable within the container-based cluster, wherein the first control plane node comprises:

first control plane components, actively running on the first control plane node, that are configured to manage other components within the container-based cluster, and a first network interface activated to allow for management of the other components within the container-based cluster by the first control plane components;

in response to determining the first control plane node is unreachable, activating a second control plane node previously deployed in the container-based cluster, wherein prior to activating the second control plane node the second control plane node comprises:

second control plane components, not actively running on the second control plane node, that are configured to manage the other components within the container-based cluster, and a second network interface deactivated and configured to allow for management of the other components within the container-based cluster by the second control plane components;

assigning an internet protocol address of the first control plane node to the second control plane node;

broadcasting a gratuitous address resolution protocol message to inform at least the other components in the container-based cluster about the assignment of the internet protocol address of the first control plane node to the second control plane node;

in response to determining the first control plane node is unreachable, removing the first control plane node from the container-based cluster;

determining a number of inactive control plane nodes associated with the second control plane node and comprising control plane components not actively running on the inactive control plane nodes is less than a minimum number of inactive control plane nodes that are to be deployed in the container-based cluster for the second control plane node; and deploying one or more inactive control plane nodes associated with the second control plane node in the container-based cluster until the minimum number of the inactive control plane nodes that are to be deployed in the container-based cluster for the second control plane node is met.

2. The method of claim 1, wherein activating the second control plane node previously deployed in the container-based cluster comprises:

activating the second control plane components on the second control plane node;

activating the second network interface to allow for management of the other components within the container-based cluster by the second control plane components.

3. The method of claim 1, wherein a witness node determines that the first control plane node is inactive, activates the second control plane node, and deploys the one or more inactive control plane nodes.

4. The method of claim 1, further comprising:

prior to determining the first control plane node is unreachable, configuring the second control plane node such that a second intended state of the container-based cluster indicated by one or more second manifests stored at the second control plane node matches a first intended state of the container-based cluster indicated by one or more first manifests stored at the first control plane node.

5. The method of claim 4, wherein:

the first control plane node further comprises a third network interface activated at the first control plane node to allow for communication with at least the second control plane node;

the second control plane node further comprises a fourth network interface activated at the second control plane node activated at the second control plane node to allow for communication with at least the first control plane node; and configuring the second control plane node comprises performing a sync between the first control plane node and the second control plane node via the third network interface and the fourth network interface.

6. The method of claim 1, wherein determining the first control plane node is unreachable within the container-based cluster comprises:

transmitting a request for a packet response from the first control plane node; and failing to receive the packet response from the first control plane node.

7. The method of claim 1, wherein:

the first control plane node comprises a first host or a first virtual machine running on the first host; and the second control plane node comprises a second host or a second virtual machine running on the first host or the second host.

8. A system comprising:

one or more processors; and at least one memory, the one or more processors and the at least one memory configured to:

determine a first control plane node is unreachable within the container-based cluster, wherein the first control plane node comprises:

first control plane components, actively running on the first control plane node, that are configured to manage other components within the container-based cluster, and a first network interface activated to allow for management of the other components within the container-based cluster by the first control plane components;

in response to determining the first control plane node is unreachable, activate a second control plane node previously deployed in the container-based cluster, wherein prior to activating the second control plane node the second control plane node comprises:

second control plane components, not actively running on the second control plane node, that are configured to manage the other components within the container-based cluster, and a second network interface deactivated and configured to allow for management of the other components within the container-based cluster by the second control plane components;

in response to determining the first control plane node is unreachable, remove the first control plane node from the container-based cluster;

assign an internet protocol address of the first control plane node to the second control plane node;

broadcast a gratuitous address resolution protocol message to inform at least the other components in the container-based cluster about the assignment of the internet protocol address of the first control plane node to the second control plane node;

determine a number of inactive control plane nodes associated with the second control plane node and comprising control plane components not actively running on the inactive control plane nodes is less than a minimum number of inactive control plane nodes that are to be deployed in the container-based cluster for the second control plane node; and deploy one or more inactive control plane nodes associated with the second control plane node in the container-based cluster until the minimum number of the inactive control plane nodes that are to be deployed in the container-based cluster for the second control plane node is met.

9. The system of claim 8, wherein activating the second control plane node previously deployed in the container-based cluster comprises:

activating the second control plane components on the second control plane node; and activating the second network interface to allow for management of the other components within the container-based cluster by the second control plane components.

10. The system of claim 8, wherein a witness node determines that the first control plane node is inactive, activates the second control plane node, and deploys the one or more inactive control plane nodes.

11. The system of claim 8, wherein the one or more processors and the at least one memory are further configured to:

prior to determining the first control plane node is unreachable, configure the second control plane node such that a second intended state of the container-based cluster indicated by one or more second manifests stored at the second control plane node matches a first intended state of the container-based cluster indicated by one or more first manifests stored at the first control plane node.

12. The system of claim 11, wherein:

the first control plane node further comprises a third network interface activated at the first control plane node to allow for communication with at least the second control plane node;

the second control plane node further comprises a fourth network interface activated at the second control plane node activated at the second control plane node to allow for communication with at least the first control plane node; and to configure the second control plane node comprises to perform a sync between the first control plane node and the second control plane node via the third network interface and the fourth network interface.

13. The system of claim 8, wherein to determine the first control plane node is unreachable within the container-based cluster comprises:

transmitting a request for a packet response from the first control plane node; and failing to receive the packet response from the first control plane node.

14. The system of claim 8, wherein:

the first control plane node comprises a first host or a first virtual machine running on the first host; and the second control plane node comprises a second host or a second virtual machine running on the first host or the second host.

15. A non-transitory computer-readable medium comprising instructions that, when executed by one or more processors of a computing system, cause the computing system to perform operations for providing a high availability control plane in a container-based cluster, the operations comprising:

determining a first control plane node is unreachable within the container-based cluster, wherein the first control plane node comprises:

first control plane components, actively running on the first control plane node, that are configured to manage other components within the container-based cluster, and a first network interface activated to allow for management of the other components within the container-based cluster by the first control plane components;

in response to determining the first control plane node is unreachable, activating a second control plane node previously deployed in the container-based cluster, wherein prior to activating the second control plane node the second control plane node comprises:

second control plane components, not actively running on the second control plane node, that are configured to manage the other components within the container-based cluster, and a second network interface deactivated and configured to allow for management of the other components within the container-based cluster by the second control plane components;

in response to determining the first control plane node is unreachable, removing the first control plane node from the container-based cluster;

assigning an internet protocol address of the first control plane node to the second control plane node;

broadcasting a gratuitous address resolution protocol message to inform at least the other components in the container-based cluster about the assignment of the internet protocol address of the first control plane node to the second control plane node;

determining a number of inactive control plane nodes associated with the second control plane node and comprising control plane components not actively running on the inactive control plane nodes is less than a minimum number of inactive control plane nodes that are to be deployed in the container-based cluster for the second control plane node; and deploying one or more inactive control plane nodes associated with the second control plane node in the container-based cluster until the minimum number of the inactive control plane nodes that are to be deployed in the container-based cluster for the second control plane node is met.

16. The non-transitory computer-readable medium of claim 15, wherein activating the second control plane node previously deployed in the container-based cluster comprises:

activating the second control plane components on the second control plane node; and activating the second network interface to allow for management of the other components within the container-based cluster by the second control plane components.

17. The non-transitory computer-readable medium of claim 15, wherein a witness node determines that the first control plane node is inactive, activates the second control plane node, and deploys the one or more inactive control plane nodes.

18. The non-transitory computer-readable medium of claim 15, wherein the operations further comprise:

prior to determining the first control plane node is unreachable, configuring the second control plane node such that a second intended state of the container-based cluster indicated by one or more second manifests stored at the second control plane node matches a first intended state of the container-based cluster indicated by one or more first manifests stored at the first control plane node.

19. The non-transitory computer-readable medium of claim 18, wherein:

the first control plane node further comprises a third network interface activated at the first control plane node to allow for communication with at least the second control plane node;

the second control plane node further comprises a fourth network interface activated at the second control plane node activated at the second control plane node to allow for communication with at least the first control plane node; and configuring the second control plane node comprises performing a sync between the first control plane node and the second control plane node via the third network interface and the fourth network interface.

20. The non-transitory computer-readable medium of claim 15, wherein determining the first control plane node is unreachable within the container-based cluster comprises:

transmitting a request for a packet response from the first control plane node; and failing to receive the packet response from the first control plane node.

* * * * *